US009326237B2

(12) United States Patent
Ligman et al.

(10) Patent No.: US 9,326,237 B2
(45) Date of Patent: *Apr. 26, 2016

(54) METHOD, APPARATUS AND COMPUTER PROGRAM PRODUCT PROVIDING PERFORMANCE AND ENERGY OPTIMIZATION FOR MOBILE COMPUTING

(71) Applicant: International Business Machines Corporation, Armonk, NY (US)

(72) Inventors: Joseph W. Ligman, Wilton, CT (US); Marco Pistoia, Amawalk, NY (US); Gegi Thomas, Piermont, NY (US); Omer Tripp, Har Adar (IL)

(73) Assignee: International Business Machines Corporation, Armonk, NY (US)

( * ) Notice: Subject to any disclaimer, the term of this patent is extended or adjusted under 35 U.S.C. 154(b) by 345 days.

This patent is subject to a terminal disclaimer.

(21) Appl. No.: 13/964,561

(22) Filed: Aug. 12, 2013

(65) Prior Publication Data

US 2014/0349571 A1 Nov. 27, 2014

Related U.S. Application Data

(63) Continuation of application No. 13/901,794, filed on May 24, 2013.

(51) Int. Cl.
*G06F 15/16* (2006.01)
*G06F 15/173* (2006.01)
*H04W 52/02* (2009.01)
(Continued)

(52) U.S. Cl.
CPC ......... *H04W 52/0209* (2013.01); *G06F 9/5094* (2013.01); *H04L 67/10* (2013.01); *Y02B 60/50* (2013.01)

(58) Field of Classification Search
CPC ..... H04L 67/06; H04L 67/1085; H04L 43/08; G06Q 30/0267; H04N 21/812; H04N 21/23424; H04M 3/42017
See application file for complete search history.

(56) References Cited

U.S. PATENT DOCUMENTS

| 8,355,711 | B2 | 1/2013 | Heins et al. |
| 8,423,344 | B1 | 4/2013 | Saghier et al. |
| 9,002,721 | B2 * | 4/2015 | Hughes ............ G06Q 10/06311 705/7.11 |

(Continued)

OTHER PUBLICATIONS

International Search Report, Sep. 24, 2014, PCT/US2014/039077.

(Continued)

*Primary Examiner* — Peling Shaw
(74) *Attorney, Agent, or Firm* — Harrington & Smith; Louis J. Percello

(57) ABSTRACT

A mobile device includes a computer-readable medium storing computer program instructions, a data processor to execute the instructions, and communication circuitry configured for local area wireless connectivity with neighboring mobile devices and for wireless connectivity to a remote server from which at least a portion of a data set is downloaded. Execution of the computer program instructions results in estimating a cost to perform a computation task on the data set. If the estimated cost is greater than a threshold cost, an ad-hoc wireless network is formed with at least one other mobile device and the mobile device downloads a portion of the data set assigned to the mobile device. The mobile device then performs a computation task on the downloaded portion of the data set and wirelessly transfers a result of the computation task to the at least one other mobile device of the ad-hoc wireless network.

7 Claims, 3 Drawing Sheets

(51) Int. Cl.
*H04L 29/08* (2006.01)
*G06F 9/50* (2006.01)

(56) References Cited

U.S. PATENT DOCUMENTS

| | | | | |
|---|---|---|---|---|
| 2004/0098447 | A1* | 5/2004 | Verbeke | G06F 9/5055 709/201 |
| 2007/0294592 | A1 | 12/2007 | Ashfield et al. | |
| 2008/0216125 | A1 | 9/2008 | Li et al. | |
| 2008/0250408 | A1 | 10/2008 | Tsui et al. | |
| 2009/0258641 | A1 | 10/2009 | Yaqub et al. | |
| 2012/0254280 | A1 | 10/2012 | Parker, II | |
| 2012/0266176 | A1 | 10/2012 | Vojnovic et al. | |
| 2013/0031550 | A1 | 1/2013 | Choudhury et al. | |
| 2013/0182845 | A1* | 7/2013 | Monica | H04L 63/0869 380/270 |
| 2014/0141744 | A1* | 5/2014 | Miluzzo | H04W 4/08 455/406 |
| 2015/0170209 | A1* | 6/2015 | Smith | G06Q 30/0267 705/14.64 |

OTHER PUBLICATIONS

Milojicic et al. Jul. 3, 2003, Peer-to-Peer Computing. Retrived from (http://www.researchgate.net/profile/Jim__Pruyne/publication/2494470__Peer-to-Peer__Computing/links/0deec51dfaa653a93e000000.pdf).

* cited by examiner

METHOD, APPARATUS AND COMPUTER PROGRAM PRODUCT PROVIDING PERFORMANCE AND ENERGY OPTIMIZATION FOR MOBILE COMPUTING

CROSS-REFERENCE TO A RELATED PATENT APPLICATION

This patent application is a continuation patent application of copending U.S. patent application Ser. No. 13/901,794, filed May 24, 2013, the disclosure of which is incorporated by reference herein in its entirety.

TECHNICAL FIELD

The exemplary embodiments of this invention relate generally to mobile computing and, more specifically, relate to mobile computing performed by a plurality of mobile devices capable of inter-device communication.

BACKGROUND

Mobile devices, such as smartphones, tablets and laptop computers, are capable of nearly constant internet connectivity with immediate access to online information, as well as the ability to communicate with peers and friends through chat, social networks and email. Mobile devices also allow the user to run general software, including a rich selection of native mobile applications.

However these inherent abilities of fetching remote data and running arbitrary computations have associated costs. Specifically, there are performance and energy costs that can dominate the user experience if the data to be fetched is of substantial size and/or if the needed computation is long and intensive. The result can be long waiting times for the user as well as excessive consumption of battery power.

SUMMARY

In a first aspect thereof the embodiments of this invention provide a method to share a computation task amongst a plurality of devices including at least one mobile device. The method comprises estimating a cost to perform a computation task on a data set. If the estimated cost is greater than a threshold cost, the method further comprises forming an ad-hoc wireless network comprised of a plurality of devices; downloading a portion of the data set to individual ones of the devices; performing a computation task by each device on the portion of the data set that is downloaded to the device; and wirelessly transferring a result of the computation task from each device to all other devices of the ad-hoc wireless network.

In another aspect thereof the embodiments of this invention provide a computer-readable medium that stores computer program instructions that, when executed by a data processor, result in performance of operations comprising estimating a cost to perform a computation task on a data set; if the estimated cost is greater than a threshold cost, forming an ad-hoc wireless network comprised of a plurality of mobile devices; downloading a portion of the data set to individual ones of the mobile devices; performing a computation task by each mobile device on the portion of the data set that is downloaded to the mobile device; and wirelessly transferring a result of the computation task from each mobile device to all other mobile devices of the ad-hoc wireless network.

In yet another aspect thereof the embodiments of this invention provide a mobile device that comprises a computer-readable medium that stores computer program instructions; a data processor coupled with the computer-readable medium to execute the instructions; and communication circuitry configured for local area wireless connectivity with neighboring mobile devices and for wireless connectivity to a remote server from which a portion of a data set is downloaded. Execution of the computer program instructions by the data processor results in performance of operations that comprise estimating a cost to perform a computation task on the data set; if the estimated cost is greater than a threshold cost, forming an ad-hoc wireless network with at least one other mobile device; downloading the portion of the data set to the mobile device, the downloaded portion of the data set differing from a portion of the data set downloaded by the at least one other mobile device; performing a computation task on the portion of the data set that is downloaded to the mobile device; and wirelessly transferring a result of the computation task from the mobile device to the at least one other mobile device of the ad-hoc wireless network. A further operation involves wirelessly receiving from the at least one other mobile device a result of the computation task that was performed by the at least one other mobile device on the portion of the data set that was downloaded to the at least one other mobile device.

DETAILED DESCRIPTION

Figure 1:
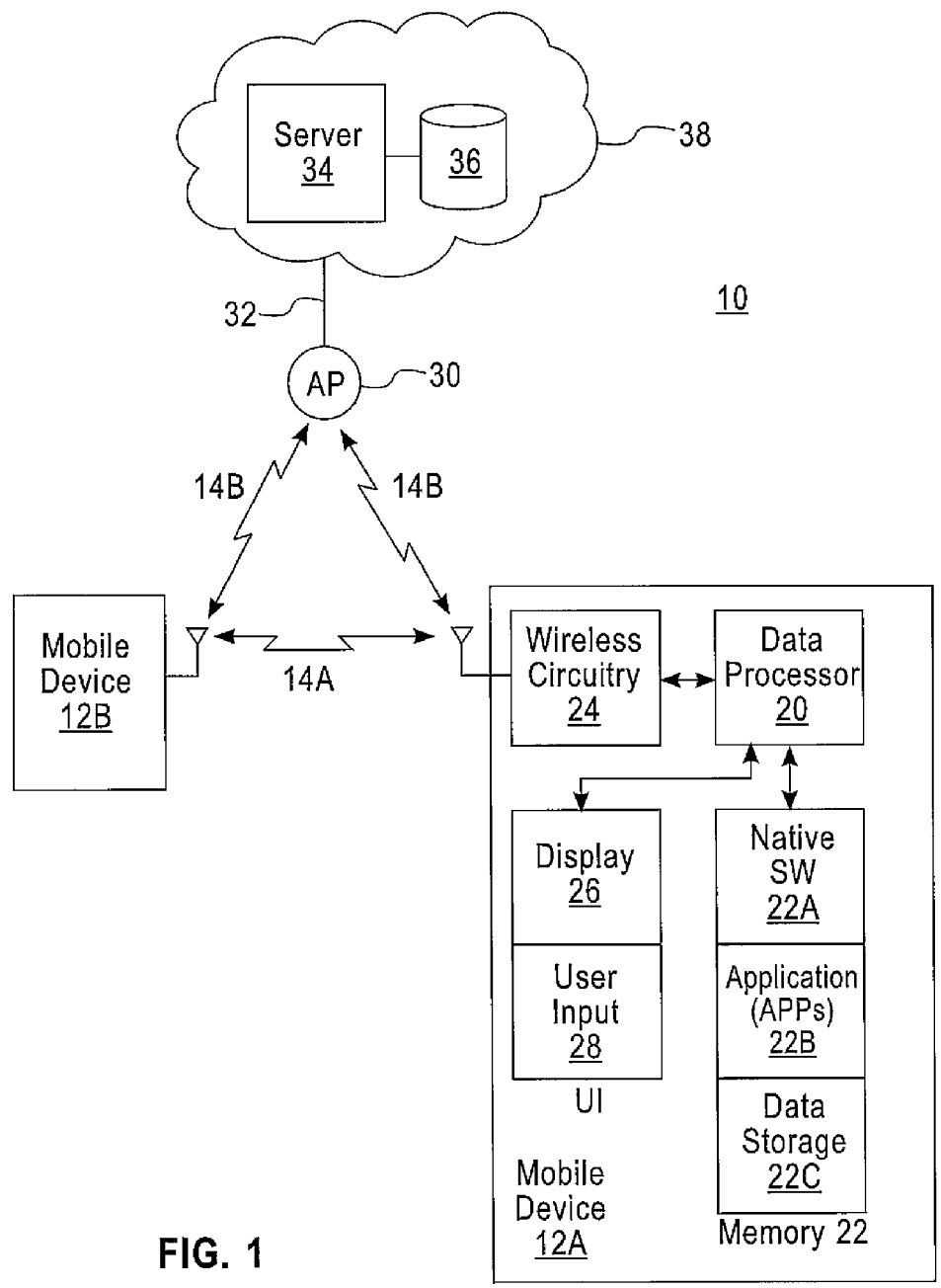
FIG. 1 illustrates one non-limiting example of a group or social group of mobile devices in which the invention can be implemented.

By way of introduction two broad and non-limiting examples of mobile computing that are of interest to the embodiments of this invention, and that can arise in a social context, are described below.

In a first example a person is about to give a presentation to a group of people. The slides for the presentation are available online, and the speaker encourages the audience to download them to enjoy more freedom in jumping back and forth between the presentation materials. The slides can be a heavy resource to download via a wireless connection and, moreover, all of the people in the audience can be simultaneously attempting to download the slides from the same source. This download scenario can result in frustration among many in the audience who require a substantial amount of time to download the slides and who may sometimes experience failures during the download process, mandating restarting the download process. Further, the download time can consume a considerable amount of battery power for the mobile devices associated with the members of the audience.

In a second example a team of people can all be required to run some image-processing application on a large database of images (or to run an obfuscation application with some code repository, or to run a data-mining application with a set of documents, etc.). This process can be computationally, time-wise and energy expensive, requiring substantial time to complete while consuming considerable energy. As each person can be running their own local copy of the application the entire team can be delayed for a considerable amount of time, and battery energy loss across the entire team is maximized.

These examples are illustrative of many mobile computing situations where an ability to share a computation load would be highly useful.

The embodiments of this invention provide methods, apparatus and computer programs for optimizing mobile computations in a social setting. A social setting may be considered as a group of two or more persons each having a mobile device capable of performing computations and bi-directionally communicating with other mobile devices as well as with at least one remote site, such as an enterprise server and/or a cloud-based server or servers from which data to be processed can be downloaded. By use of the bi-directional communication capabilities of the mobile devices a transient ad-hoc network comprised of mobile device nodes can be established at least for establishing computation responsibilities amongst the mobile devices and for sharing of the results of the computations.

A mobile device can be any type of device having some computation capability and interface capability with other mobile devices and with one or more external networks. The interface capability is preferably based on one or more types of wireless communication capability but can be implemented in whole or in part via a wired connection (e.g., a cable). Suitable examples of mobile devices include, but are not limited to, laptop computing devices, notebook computing devices, tablet computing devices, smartphones and, in general, any type of computing device having, preferably, an ability to wirelessly connect (e.g., via radio frequency signals and/or optical signals) with other devices having the same or about the same capabilities. For example, a group or population of wireless devices that form an ad-hoc network could include one or more laptops, one or more tablets and one or more smartphones. Further, it should be realized that in some situations one or more of the devices that form an ad-hoc network with at least one mobile device may not be truly mobile. As but one example, if a project team were meeting in the office of the project leader, and the members of the team each had an associated mobile device, then an office desktop PC or workstation of the team leader, having at least local wireless connectivity capabilities, could also function as a node in the ad-hoc network that is formed amongst all of the devices that are present.

FIG. 1 illustrates one non-limiting example of a group or social group 10 of mobile devices 12. In this example two mobile devices 12A and 12B are shown, although in practice there could be three or more mobile devices present. Mobile devices 12A and 12B could be the same type of device or they may be different types of devices. The mobile devices 12A, 12B are assumed to have some minimal functionality, illustrated by the mobile device 12A, including for example a central processing unit (CPU) or data processor 20 (e.g., a microprocessor) connected with one or more computer readable mediums, that can be embodied as one or more memories 22, and with at least one type of wireless communication circuitry 24. In general each mobile device 12A, 12B can be assumed to include some type of user interface (UI) such as a display screen 26 and a user data input 28 such as a keyboard or keypad or a touch-sensitive surface (possibly part of the display screen 26) and/or a voice input and recognition system.

The memory 22 can be any type of memory device or multiple devices suitable for integration into the mobile device. The memory 22 can be assumed to store native software 22A needed to operate the mobile device 12 and to also store at least one application (APP) program or software 22B that is configured to operate in accordance with the embodiments of this invention. The memory 22 is also assumed to include some type of data storage 22C to store, for example, downloaded data, to store results of computations, and to store temporary variables and related data needed during computation/processing of the downloaded data.

The wireless communication circuitry 24 can be based on, for example, a low power, short range, local area technology such as Bluetooth™ or a WiFi-type of technology. In some cases the wireless communication circuitry 24 will also include a longer range, wider area wireless technology such as a cellular radio transceiver and related circuitry and software.

The mobile devices 12A, 12B are assumed to have the capability for inter-device communication via local bi-directional wireless links 14A as well as the capability to connect via the same or another wireless link 14B to at least one access point (AP) 30 which in turn provides connectivity via one or more networks 32 to at least one remote server 34 and data storage 36. The remote server 34 and data storage 36 could be physically instantiated at some enterprise such as a corporate enterprise or it could be virtualized and reside in a computing cloud 38. In some exemplary embodiments the inter-device links 14A could be Bluetooth™ links and the links 14B could also be a Bluetooth™ link to a local AP 30 (e.g., one positioned in the same physical space as the mobile devices 12A, 12B.) In some other exemplary embodiments the inter-device links 14A could be Bluetooth™ links and the link 14B could be a cellular link or some other type of wide area RF link. In this case the AP 30 could be a cellular or other type of base station.

It should be appreciated that the examples of the embodiments of this invention are not limited for use with any particular types of mobile devices, and that the embodiment shown in FIG. 1 is merely provided as one non-limiting example of a suitable technological context in which the embodiments of this invention can be realized.

One aspect of this invention is a realization that there are many common situations—in general and especially in corporate and other types of large organizations—where multiple people have a common processing task (either IO bound or CPU bound or both), and could optimize the overall process, both in performance (e.g., the running time of the process) and in energy consumption, by sharing the processing task workload across different mobile devices 12.

This type of arrangement implies the presence of some notion of trust between the different individuals with respect to the shared data and computation, and further can imply some degree of mutual self-interest with respect to a given processing task. In one case these criteria can be satisfied by a social setting where the individuals are already socially connected, know each other, and trust each other. For example, the device 12 associated with a certain user can contain an address or contacts or other type of list identifying other devices associated with colleagues, friends, associates, etc., of the user and which may be assumed to represent "trusted" devices. In another case at least some of these criteria can be satisfied by the use of an authentication token that is exchanged between or that is otherwise common to the mobile devices 12 of the individuals. The authentication token can be any type of token, such as a passcode that protects a meeting that all of the individuals are attending. The use of the authentication token removes any need for the individuals to have any type of a priori social connectivity or relationships prior to forming an ad-hoc network for the purpose of executing some type of coordinated computing task on data.

Figure 2:
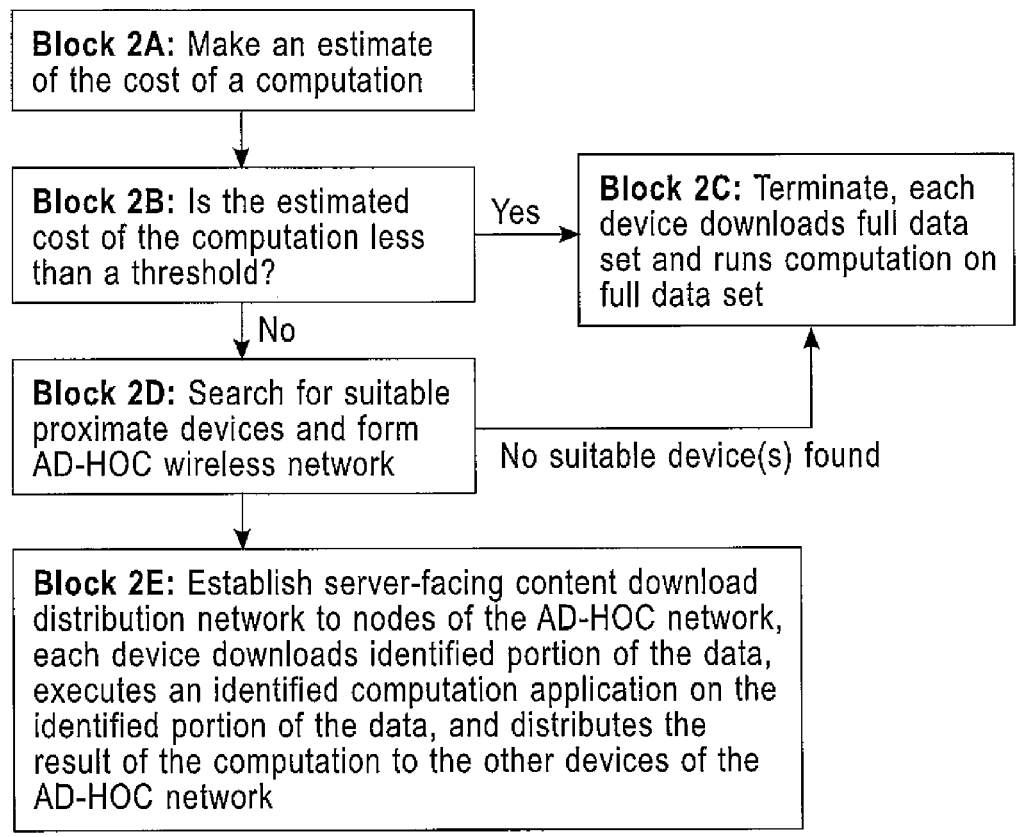
FIG. 2 is a logic flow diagram that illustrates the operation of the embodiments of this invention.

In a general form the operation of the embodiments of this invention has the structure exemplified by the logic flow diagram of FIG. 2. The various steps can be assumed to be performed at least in part by execution by the data processor 20 of one or more of the application programs 22B stored in the memory 22, in concert with other components of the mobile devices 12A and 12B.

Block 2A: Assuming that a needed computation has been identified, upon starting the computation a rough estimate is made of the cost of the computation. This can be done in several ways including, but not limited to, tracking statistics over time; extrapolating cost estimates from past computations that are similar or related; and using explicit predefined cost models for certain computations (e.g., based on one or more of the size of a resource to be downloaded and the maximum input size for a CPU-bound computation). In general the cost considered can include one or more parameters such as time, cost per bit, available bandwidth, energy consumption and the like.

It should be noted that not all of the mobile devices 12A, 12B need perform this step. For example, in practice this step could be performed by one mobile device, such as the mobile device associated with a person who identifies the needed computation and who then initiates the formation of the possible collaborative distributed computation task. For convenience this mobile device can be referred to as an initiating mobile device.

Block 2B: If the estimated cost of the computation is less than some threshold, then the process can terminate and the download of the data and the needed computation can be simply performed by the individual mobile devices 12 or by the initiating mobile device (Block 2C). The threshold can be a fixed threshold or a variable threshold. For example, if a 30 minute meeting is scheduled and if the estimated time cost of the data download and resulting computation is less than three minutes, then a decision may be made to not form the collaborative group of mobile device nodes. If the estimated time cost exceeds three minutes in this example then the decision may be made to form the collaborative group of mobile devices 12.

Block 2D: If the estimated cost is greater than the threshold then a search is made for proximate mobile devices 12, i.e., for other computation nodes in the vicinity of the initiating mobile device. The other computation nodes can be other mobile devices 12 that are socially connected to the initiating mobile device, or simply any other mobile devices 12 in the vicinity to which an invitation to join the mobile collaboration can be sent. This step can be accomplished by leveraging any application program interfaces (APIs) that are exposed by conventional social networks, in conjunction with the identity of the current device's user. This step can also be accomplished by building a specialized protocol (over TCP-IP or Bluetooth™ or other low-level protocols) to find relevant neighbor mobile devices 12.

It should be noted that this step can be performed autonomously by each mobile device, i.e., each mobile device can independently computer the cost, compare the cost to the threshold, and then begin the search for proximate mobile devices 12 if the cost exceeds the threshold.

As a part of the decision making in Block 2B a handshake protocol can be used to check whether a specific computation can be shared, or split, between the mobile devices 12. The exchanged messages between mobile devices 12 can include, for example, (i) an identification of the computation application that will be executed, (ii) a unique identifier of the data to be processed, and (iii) a point in the computation that each device is to assume (what portion or chunk of the identified data is to be assigned to each mobile device). If a determination is made, for whatever reason, that the specific computation cannot be shared or split then control can simply pass to Block 2C and the needed computation can be performed by each mobile device 12 individually or by just the initiating mobile device 12 who then shares the result of the computation with authorized neighbor mobile devices 12 via the local links 14A.

It can be noted that building the ad-hoc network of mobile devices 12 can include an exchange of the authentication tokens to ensure that neighboring devices 12 can present a valid token and are thus considered as being acceptable to join the collaborating group of devices 12. If a particular device cannot present a valid authentication token, then that particular device can be eliminated from the pool of potential collaborating devices 12.

It can also be noted that this step can include a user's device notifying the user via the UI that a request has been received to join a collaborating group of devices 12, thereby giving the user an opportunity to manually accept or decline the request. For example, one user may be nearly out of battery power and may decline the request simply in order to conserve what remaining battery power the device has.

Block 2E: In the event of an agreement being reached with one or more other devices 12 to share the computation then a server-facing content download distribution network is established between the nodes of the ad-hoc network thus formed. Each device downloads its identified portion of the data, executes the identified computation application on its identified portion of the data and then distributes the result of the computation to the other devices 12. The identified computation application can be downloaded as well if not already resident in the mobile device. At the completion of this step each device of the collaborating group of devices 12 has stored in the portion 22C of the memory 22 the complete result of the computation on the entire set of data.

It is pointed out that the computation portion of Step 2E can be complex or it can be trivial, depending on the application. For example, in one possible scenario the mobile devices 12 each download a partition or portion (chunk) of a large data set and the computation performed by each mobile device 12 can involve execution of a statistical analysis program on the downloaded chunk. However in another scenario, such as the one outlined above, the individual mobile devices 12 may each download some portion of a large data set (e.g., some number x of presentation slides from a set of y presentation slides, where x<y) that are then shared with other mobile device nodes of the ad-hoc network group so that each mobile device 12 of the group has a full set of the slides for presentation to their respective users via the mobile device display screen 26. In this case the computation task performed by each device after the download phase may simply be to verify that is has correctly received the correct number of slides, and distributing the results of the computation task may simply be wirelessly transferring the received set of slides to all of the other member nodes of the ad-hoc network. The transfer of the slides over the ad-hoc network can be accomplished atop an efficient protocol such as, for example, the Bluetooth™ protocol.

Note that once the ad-hoc network of mobile computation nodes is established there is no need for any type of central control or management node or function, as the individual computation nodes can operate autonomously to download data, process the data and distribute the results of the processing to the other mobile computation nodes. At the completion of this process the ad-hoc network can simply be torn down and cease to exist.

One example of the use of this invention, previously outlined above, relates to the downloading of a large document by multiple participants in a meeting (e.g., sitting in the same conference room). For this situation the cost estimation (Step 2A) could consider the document size. In this example each of the different mobile devices 12 (e.g., smartphones, tablets, laptops, etc.) begin searching for neighboring devices 12 with which they can share the downloading cost, e.g., in one embodiment according to social connectivity with regard to some professional social network (such as an enterprise or corporate social network), which ensures that there are no security threats involved such as information leakage.

Alternatively in another embodiment the authentication token(s) can be exchanged between the different mobile devices 12 without regard for any prior professional or social relationships that may exist between the users of the mobile devices 12. So long as a valid authentication token is presented the mobile device 12 presenting the token may be deemed to be an authorized mobile device that is trusted to download the data and perform one or more operations on the data (where the one or more operations may consist of just distributing the respective downloaded portion to the other mobile devices 12 of the ad-hoc network).

Conventional download algorithms (as implemented in, for example, web browsers) are capable of downloading a large data resource in chunks and then combining the chunks later as is the case when the connection breaks in the middle of a download, which is then resumed rather than restarted from scratch. This approach can be used to implement the sharing protocol between the different devices 12. After the different chunks of remote data are fetched locally, efficient local transfer protocols (such as Bluetooth™) can quickly distribute all chunks between all devices 12 within each sharing group. The result is a fast download process, while also optimizing energy costs.

Figure 3:
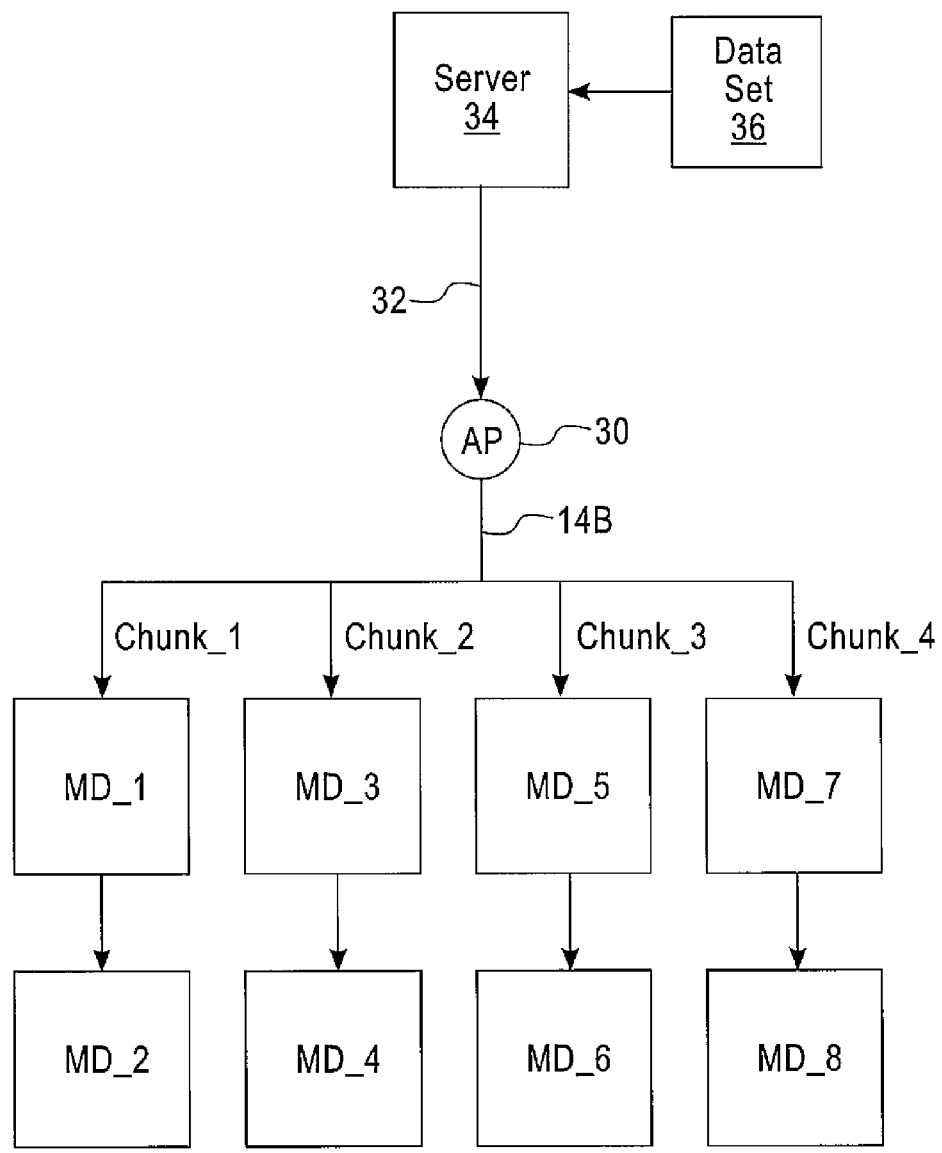
FIG. 3 shows a plurality of mobile devices and the downloading of duplicate portions of a data set to be processed to achieve redundancy.

In a transient ad-hoc network of mobile devices 12 it is possible that one of the devices may leave the network. For example, the user could simply carry the mobile device to a location that is no longer in communication range of the other mobile devices 12, or one of the mobile devices 12 could run out of battery power. This type of situation can be accommodated is several ways. For example, and referring to FIG. 3, assume a non-limiting case of eight mobile devices (MD_1-MD_8) in the ad-hoc network. In this exemplary case data redundancy can be used such that the data set is partitioned into four chunks and each of the four chunks is downloaded to and operated on by two of the eight mobile devices 12, e.g., Chunk_1 is downloaded to MD_1 and MD_2, Chunk_2 is downloaded to MD_3 and to MD_4, etc. In this case if any one of the eight mobile devices 12 is disconnected from the ad-hoc network during the data download phase, or during the computation phase, or during the result sharing phase then a processed set of result data for the corresponding data chunk will still be available to the other mobile devices 12 from the remaining mobile device 12 of the redundant pair.

As an alternative solution one may assume that the data set is partitioned into eight chunks and each of the eight mobile devices MD_1-MD_8 downloads one of the eight chunks. In the event one of the eight mobile devices 12 becomes disconnected during the data download phase, or during the computation phase, or during the result sharing phase then during the results sharing phase there will be one missing set of results data. In this case all of the remaining seven mobile devices 12 can download the corresponding data chunk from the server 34 and perform the needed operation on that data chunk to derive the missing set of results data. Alternatively one of the remaining seven mobile devices 12 can download the corresponding data chunk from the server 34 (such as the initiating mobile device), perform the needed operation on that data chunk to derive the missing set of results data, and then distribute the result data to the other six mobile devices 12.

When redundancy is provided any mobile device receiving a duplicate set of results data from one or more of the other mobile devices of the ad-hoc network can simply ignore or delete the received duplicate set of results data. Alternatively the mobile device could compare the duplicate sets of result data to ensure that they are consistent before deleting one of the duplicate sets of results data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit', a 'module' or a 'system'. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a single local computer, partly on the local computer, as a stand-alone software package, partly on the local computer and partly on a remote computer or entirely on the remote computer or server. In the latter scenario, the remote computer may be connected to the local computer through any type of network, including a LAN or a WAN, or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A mobile device comprising:
   a computer-readable medium that stores computer program instructions;
   a data processor coupled with the computer-readable medium to execute the instructions;
   communication circuitry configured for local area wireless connectivity with neighboring mobile devices and for wireless connectivity to a remote server from which at least a portion of a data set is downloaded;
   where execution of the computer program instructions by the data processor result in performance of operations that comprise,
   estimating a cost to perform a computation task on the data set;
   if the estimated cost is greater than a threshold cost, operating the communication circuitry to form an ad-hoc wireless network with at least one other mobile device;
   downloading via the communication circuitry the portion of the data set to the mobile device, the downloaded portion of the data set differing from a portion of the data set downloaded by the at least one other mobile device;
   performing a computation task on the portion of the data set that is downloaded to the mobile device; and
   wirelessly transferring via the communication circuitry a result of the computation task from the mobile device to the at least one other mobile device of the ad-hoc wireless network;
   where the operation of downloading the portion of the data set redundantly downs the portion of the data set to another mobile device of the ad-hoc wireless network to form a redundant pair of mobile devices of the ad-hoc wireless network, where each mobile device of the redundant pair of mobile devices performs the computation task on the downloaded portion of the data set, and where the result of the computation task is available to be transferred from one of the redundant pair of mobile devices to other devices of the ad-hoc wireless network in an event that one mobile device of the redundant pair of mobile devices is unable to complete the computation task, and where for a mobile device of the ad-hoc wireless network that receives via the communication circuitry a set of results data from each mobile device of the redundant pair of mobile devices, the receiving mobile device compares one set of received results data to another set of received results data to ensure that the two sets of result data are consistent before deleting one of the received sets of results data.

2. The mobile device of claim 1, where execution of the computer program instructions by the data processor further result in performance of an operation of wirelessly receiving from the at least one other mobile device a result of the computation task that was performed by the at least one other mobile device on the portion of the data set that was downloaded to the at least one other mobile device.

3. The mobile device of claim 1, where the operation of forming the ad-hoc wireless network comprises an operation of searching for trusted mobile devices within local area wireless communication range of the mobile device, where a trusted mobile device is one with which the mobile device has a pre-existing social relationship.

4. The mobile device of claim 1, where the operation of forming the ad-hoc wireless network comprises an operation of searching for trusted mobile devices within local area wireless communication range of the mobile device, where a trusted mobile device is one that presents a valid authentication token.

5. The mobile device of claim 1, where the operation of forming the ad-hoc wireless network comprises wirelessly exchanging messages between mobile devices to identify the computation task to be performed, an identifier of the data set to be processed, and what portion of the data set is to be assigned to each mobile device.

6. The mobile device of claim 1, where if it is determined that the estimated cost is not greater than the threshold cost, the operations instead comprise downloading all portions of the data set to the mobile device and performing the computation task on all portions of the downloaded data set.

7. The mobile device of claim 1, where the operation of downloading a portion of the data set is accomplished by wirelessly downloading the portion of the data set from the remote server.

\* \* \* \* \*